A. LARSEN.
ROTARY KILN.
APPLICATION FILED MAY 12, 1920.

1,358,759.

Patented Nov. 16, 1920.

WITNESS

INVENTOR
Axel Larsen
BY
Redding & Greeley
ATTORNEYS

A. LARSEN.
ROTARY KILN.
APPLICATION FILED MAY 12, 1920.

1,358,759.

Patented Nov. 16, 1920.
2 SHEETS—SHEET 2.

WITNESS

INVENTOR
Axel Larsen
BY
Redding & Greeley
ATTORNEYS

UNITED STATES PATENT OFFICE.

AXEL LARSEN, OF AALBORG, DENMARK, ASSIGNOR TO F. L. SMIDTH & CO., OF NEW YORK, N. Y., A CORPORATION OF NEW JERSEY.

ROTARY KILN.

1,358,759.  Specification of Letters Patent.  Patented Nov. 16, 1920.

Application filed May 12, 1920. Serial No. 380,853.

*To all whom it may concern:*

Be it known that I, AXEL LARSEN, a subject of the King of Denmark, residing in Aalborg, Denmark, have invented certain new and useful Improvements in Rotary Kilns, of which the following is a specification, reference being had to the accompanying drawings, forming a part hereof.

This invention has for its object to effect an economy in the burning or sintering of watery materials such as the mixture of cement raw material and water, commonly known as slurry, in the wet process of cement burning, particularly as the same is carried on in rotary kilns. In this process, as ordinarily carried on, the slurry, in a liquid state, is fed in at the upper end of the rotary kiln and in the upper portion of the kiln the water is evaporated, leaving the raw material in a condition like meal. As the progress of the raw material continues through the kiln the raw meal is heated to a temperature sufficiently high to begin the driving off of the carbonic acid and then reaches that portion of the kiln where the carrying off of the carbonic acid is completed and the sintering is effected. Finally, at the lower end of the kiln, where combustion of the fuel begins, the cooling of the clinker begins and the clinker passes from the kiln. The temperature necessary to effect the sintering of the cement raw material is necessarily high and the quantity of heat, that is to say, the volume of hot gases or products of combustion which passes from the sintering zone of the kiln or from that portion of the zone in which carbonic acid is driven off, is greater than that required for the heating of the raw material and, it may be, greater than that required for the evaporation of the water in the upper part of the kiln. The special object in view in this invention is to enable what may be called the surplus heat from the sintering zone of the kiln or from that portion of the zone in which carbonic acid is driven off to be employed for some useful purpose, such as the heating of a boiler or the heating of the raw meal for use in another sintering kiln and thereby to effect a substantial economy in the operation. To this end the kiln, in the present case, is so constructed, as hereinafter described, that a portion of the hot gases or products of combustion from the portion of the kiln in which carbonic acid is driven off is directed through the chamber of a boiler and is then returned to the heating and drying portion of the kiln. The construction is such and the provisions for handling the cement raw material are such that all or any part of the hot gases or products of combustion can be directed through the heating chamber of the boiler. In this manner it is possible to realize a great portion of the fuel value of the fuel necessarily used in the sintering operation and in driving out carbonic acid, which would otherwise be wasted. The invention will be more fully explained hereinafter with reference to the accompanying drawings in which it is illustrated and in which—

Figure 1:
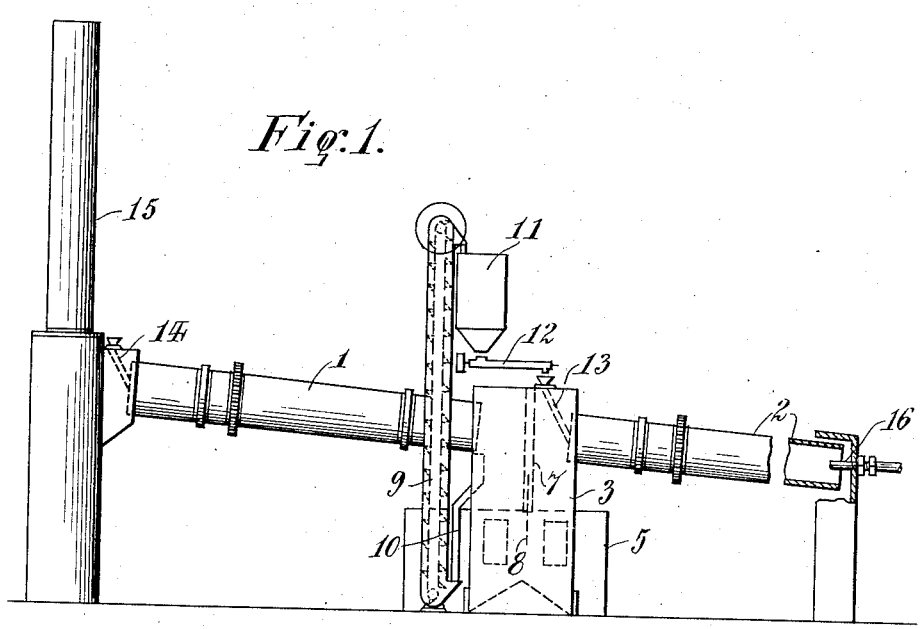
Figure 1 is a view in side elevation and in outline of so much of a kiln and its appurtenances as is necessary to enable the invention to be understood.
Figure 2:
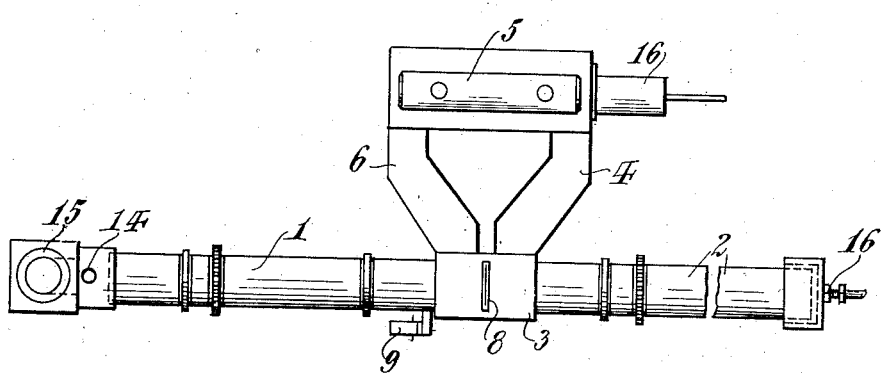
Fig. 2 is a top view of the same also in outline.

The kiln shown in the drawing is composed of two independent sections, each supported in the usual manner and rotated by the usual means. The upper section 1 receives the slurry through the feed chute 14 and communicates with the stack 15. In this upper portion 1 the water of the slurry or watery material is evaporated and the raw meal is thoroughly dried. The lower portion 2 of the kiln receives at its upper end the heated raw meal and at its lower end receives the fuel and discharges the clinker in the usual manner. Between the upper portion 1 and the lower portion 2 is a chamber 3 into which project the lower end of the upper portion 1 of the kiln and the upper end of the lower portion 2 of the kiln. This chamber communicates through a conduit 4 with the heating chamber of a boiler plant 5, which may be of ordinary construction, and such heating chamber again communicates through a conduit 6 with the chamber 3. A partition wall 7 is placed in the chamber 3 between the ends of the kiln portions, leaving below it an opening, between the mouths of the conduits 4 and 6, which may be controlled by a regulating damper 8. The dry, raw meal from the portion 1 of the kiln is delivered through a chute 10 to the lower end of an elevator 9, of usual construction, by which the raw meal is elevated and delivered to a hopper 11. From the latter it is delivered by a measuring conveyer 12, also of ordinary construction, to a chute 13 by which in turn it is directed into the upper end of the portion 2 of the kiln where the carbonic acid is driven off. It is presumed that under usual conditions of operation the boiler plant 5 will be provided with auxiliary heating means, indicated generally at 16, which may be of the same character as the means commonly employed for the heating of the kilns, such as a pulverized coal or oil burner.

It will now be understood that by the construction shown and described the hot gases or products of combustion from the portion 2 of the kiln where the carbonic acid is driven off, still at a very high temperature, are reduced in temperature and made to perform useful work in their passage through the boiler plant, wherein they are mingled with the products of combustion from the auxiliary furnace or heating means, and are then introduced into the heating and drying portion 1 of the kiln, their temperature still being sufficient first to heat the raw meal to the required degree and then, as they pass on, to evaporate the water of the slurry. Should the regulating damper 8 be moved to close completely the opening through the partition wall 7 of the chamber 3 all of the products of combustion from the portion 2 of the kiln where the carbonic acid is driven off will be directed to the boiler plant, and the volume of such products of combustion so passing through the boiler plant may be regulated by adjustment of the damper 8 as conditions require, while the passage of the raw meal from the upper portion of the kiln to the lower portion goes on, through the described means, without interruption.

Figure 3:
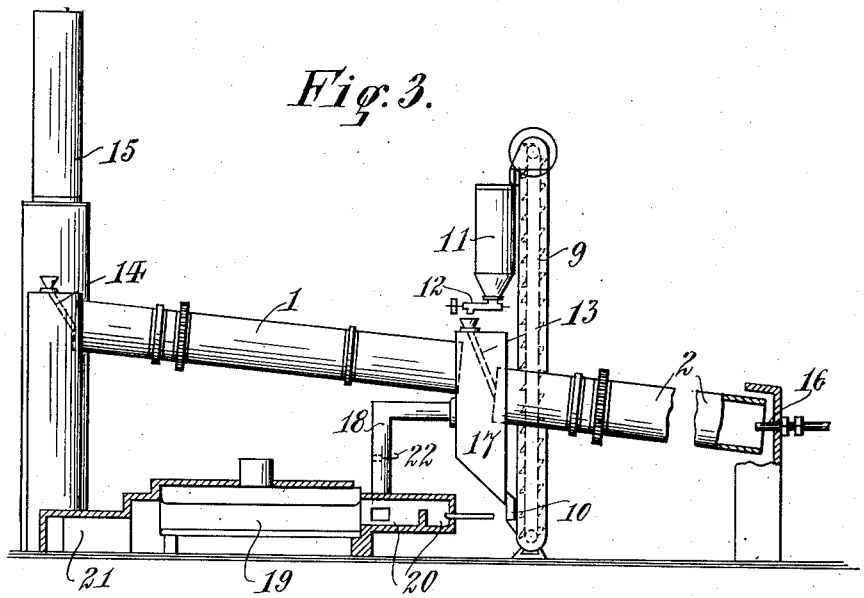
Fig. 3 is a view similar to Fig. 1, but partly in section, illustrating slight modifications.
Figure 4:
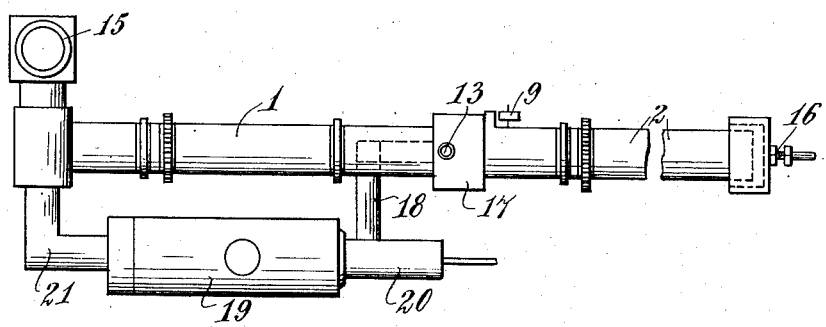
Fig. 4 is a top view of the construction shown in Fig. 3.

In the embodiment of the invention illustrated in Figs. 3 and 4 the products of combustion from the boiler plant or other heating chamber, in which the surplus heat from the portion of the kiln where the carbonic acid is driven off is used, are delivered to the stack instead of being delivered to the upper portion of the kiln and the provisions for delivering such surplus heat to the heating chamber are slightly modified. In this construction the interposed chamber 17 has no partition wall but communicates with both portions of the kiln as before. The raw meal from the upper portion of the kiln is delivered to the chamber 17 and thence through the chute 10 to the elevator 9 by which it is delivered, as before, to the hopper 11 and thence by the conveyer 12 and chute 13 to the lower portion 2 of the kiln. The chamber 17 is connected by a conduit 18 with the heating chamber 19 of the boiler or other plant which may also be provided with an auxiliary furnace or heating means, as at 20. The products of combustion from the heating chamber 19 are conducted by a conduit 21 direct to the stack 15. A damper 22, in the conduit 18, serves to control the passage of products of combustion from the chamber 17 to the heating chamber 19 and thence to the stack. Except as just indicated, the operation of this embodiment of the invention is the same as that already described.

It will be understood that various changes in details of construction and arrangement will be made to suit different conditions of use and that the invention is not limited to the precise construction shown and described herein except as pointed out in the claims.

I claim as my invention:

1. In a rotary kiln, the combination of an upper kiln portion, a lower kiln portion, a heating chamber, a chamber interposed between the two kiln portions and communicating with both, means to direct products of combustion from the lower kiln portion to the heating chamber, and means to convey the material from the upper portion of the kiln to the lower portion.

2. In a rotary kiln, the combination of an upper kiln portion, a lower kiln portion, a heating chamber, a chamber interposed between the two kiln portions and communicating with both, means to direct products of combustion from the lower kiln portion to the heating chamber, means to direct products of combustion from the heating chamber to the upper kiln portion, and means to convey the material from the upper portion of the kiln to the lower portion.

3. In a rotary kiln, the combination of an upper kiln portion, a lower kiln portion, a heating chamber, a chamber interposed between the two kiln portions and communicating with both, a partition wall and damper in said last named chamber between the ends of the kilns, means to direct products of combustion from said last named chamber at one side of the partition to the heating chamber and thence to said last named chamber at the other side of the partition, and means to convey the material from the upper portion of the kiln to the lower portion.

This specification signed this 15th day of April, A. D. 1920.

AXEL LARSEN.

Witnesses as to signature:
P. O. KEMP,
K. BIRCH.